April 25, 1961        H. F. HICKS, JR        2,981,887
ROOT-MEAN SQUARE VOLT METER FOR LOW FREQUENCY CURRENTS
Filed June 4, 1954
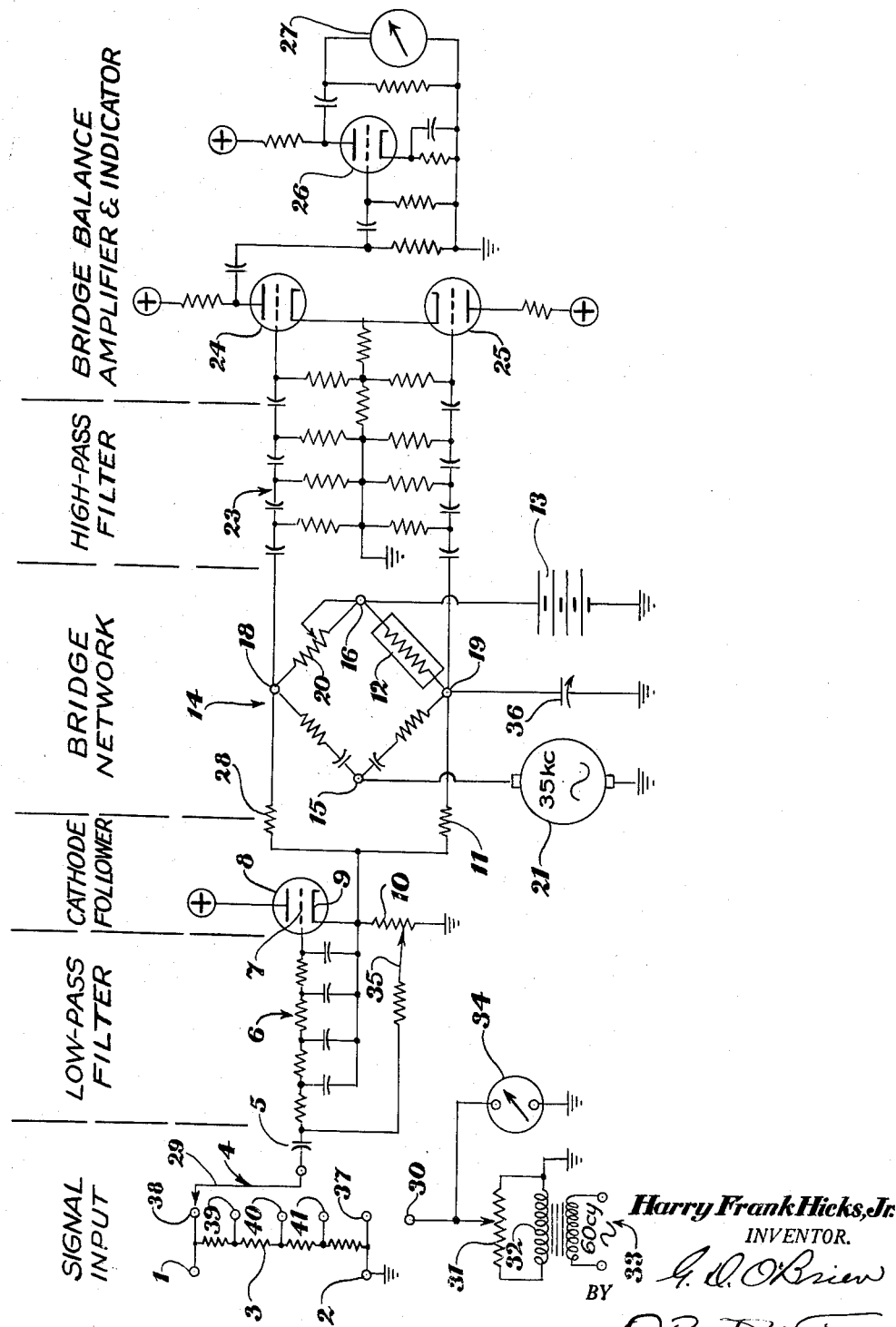
Harry Frank Hicks, Jr.
INVENTOR.

United States Patent Office 2,981,887
Patented Apr. 25, 1961

2,981,887

ROOT-MEAN SQUARE VOLT METER FOR LOW FREQUENCY CURRENTS

Harry Frank Hicks, Jr., Rochester, N.Y., assignor, by mesne assignments, to the United States of America as represented by the Secretary of the Navy Filed June 4, 1954, Ser. No. 434,683

6 Claims. (Cl. 324—98)

In investigating the various sources of stray electrical interference and the effect of such interference upon the performance of electronic equipment, especially under low-signal input conditions, it is frequently desirable to measure the value of this stray interference, or "noise," as it is commonly termed, at the input of the particular equipment. While devices for measuring the peak amplitudes of such noise are available, the information afforded by such instruments is frequently not sufficient to permit a true analysis of the conditions prevailing, particularly where, as is usual, the highest peaks are of relatively short duration. In order to obtain a more complete picture of the type of interference involved, and thus to attempt to minimize it at its source, it is desirable to determine the effective or root mean square (R.M.S.) value of the interfering energy. However, as is well known, such interference is of random frequency and amplitude and has an extremely irregular and unpredictable wave form. The problem of determining the R.M.S. value of this noise has, therefore, posed a rather serious problem which has not heretofore been satisfactorily solved. This is particularly true as regards the energy present in the very low frequency components of the total noise energy.

It is, therefore, an object of this invention to provide an apparatus for determining the effective or R.M.S. amplitude of the very low frequency components present in such stray electrical noise.

A further object is to provide such a device which utilizes the variation in resistance caused by the heating effect of a low frequency input signal of unknown or random wave form upon a nonlinear, thermally sensitive resistance of the type commonly known as a thermistor.

A still further object is to provide such an apparatus in which a thermistor of relatively long thermal time constant is employed and wherein only the relatively low frequency components of the input signal will be effective to vary the resistance of the thermistor.

Still another object is to provide an apparatus as above described wherein the unknown signal is applied to an impedance bridge, incorporating the thermistor as one element thereof, through a low-pass filter and wherein a relatively high frequency alternating current is used to polarize or excite the bridge circuit, a high-pass filter being interposed between the bridge and a bridge balance indicating means so as to prevent the input signal from directly affecting the reading of the bridge balance indicator.

Further objects will become apparent from the following description and claims, particularly when considered in the light of the accompanying drawing.

In the drawing:

Fig. 1 is a schematic circuit diagram of a measuring apparatus embodying my invention.

As shown in Fig. 1 the signal, the effective value of which is to be measured, is applied across the input terminals 1 and 2, the latter of which is grounded. Connected between these terminals is a relatively high resistance step attenuator 3 which, in conjunction with the selector switch 4, permits adjustment of the relative percentage of the input signal which is to be applied to the measuring bridge. The output from the attenuator is applied through a blocking condenser 5 and a suitable low-pass filter 6 to the input grid 7 of an electronic amplifier tube 8 connected as a cathode follower. Thus this tube has, in series with its cathode 9, a cathode resistor 10 across which the amplified output of the tube appears. The output of the cathode follower is connected through a suitable isolating resistor 11 to one end of a nonlinear, thermally sensitive resistance 12 of the type commonly known as a thermistor. The opposite end of the thermistor is connected to ground through a suitable D.C. voltage source, shown as a battery 13.

Thermistor 12 serves as one element of an A.C. impedance bridge 14 which includes a pair of input terminals 15 and 16 and a pair of bridge-balance-indicating or output terminals 18 and 19. As is shown in the drawing, thermistor 12 is connected between the output terminal 19 and the input terminal 16 while a variable resistor 20 of substantially similar resistance is incorporated in the corresponding opposite leg between the terminals 18 and 16. The effectiveness of this apparatus for measuring the R.M.S. value of low frequency signals is to a large extent dependent upon the use of a thermistor 12 having a relatively long thermal time constant, preferably of the order of several minutes. While other thermistors probably would be suitable, one such thermistor which is commercially available and has been found extremely satisfactory for use in this circuit is that known as the type WE14B.

The bridge is polarized or excited by a source of relatively high frequency energy shown as a 35 kilocycle generator 21 connected between input terminal 15 and ground. As is well known when the impedances in the bridge are properly balanced, there will be no potential difference appearing between the output terminals 18 and 19 while, conversely, under unbalance conditions a 35 kilocycle voltage, the amplitude of which will correspond to the extent of unbalance, will appear across these output terminals. In order to determine the balance condition of the bridge, the output terminals 18 and 19 are connected through a balanced type of high-pass filter 23 to the input grids of a pair of vacuum tubes 24 and 25, connected in push-pull in such fashion as to amplify any unbalance voltage appearing across the terminals 18 and 19. In order to indicate any unbalance, the output from one of these tubes may be applied to a single ended amplifier 26, which further amplifies the unbalance voltage, the value of such amplified voltage being indicated by a suitable RF type volt meter, as is indicated at 27, for example.

While the low-pass filter 6 will ordinarily be effective to remove any high frequency components from the input signal, sudden, sharp pulses might occasionally be of sufficient amplitude and duration that they would pass a certain amount of high frequency energy through to the bridge sufficient to affect the indication of the balance indicating means 27. To eliminate this possibility, the output from the cathode follower 8 is also applied to resistor 20 through an isolating resistor 28 so that this output, is in effect, applied in parallel across both resistor 20 and thermistor 12. Thus the output of the cathode follower cannot directly affect the bridge balance indicator, but can only indirectly affect it through its heating effect upon the thermistor 12.

In order to evaluate the heating effect, that is, the effective amplitude of the input signals, upon the thermistor 12, apparatus is provided for comparing this heating effect with that produced by a low frequency alternating current source of known effective amplitude. To this end the movable arm 29 of selector switch 4 may be shifted into contact with the terminal 30 of the switch which is connected to such a suitable source of 60 cycle alternating current voltage. As shown, this voltage is obtained from the movable arm of a potentiometer 31 connected to the output of a suitable transformer 32 which is in turn adapted to be connected to a conventional source of 60 cycle alternating current. The effective amplitude of the voltage at terminal 30 may be indicated by means of any conventional A.C. volt meter 34 calibrated to read the R.M.S. value of the 60 cycle sine wave voltage.

Cathode resistor 10 may incorporate or be in the form of a potentiometer having a movable contact 35 by means of which the bias appearing on the grid 7 of the cathode follower may be adjusted to the desired normal or "no-signal" value.

Depending upon the physical layout of the components which make up the bridge, it may be found that a variable condenser 36 may be provided between one of the terminals 18 or 19 and ground so as to balance out any difference in stray capacities between the two sides of the bridge and ground.

As shown in the drawing, the low- and high-pass filters 6 and 23 are illustrated as being made up of a series of individual resistance-capacity networks arranged in series. Obviously any known type of filter having the desired pass characteristics could be employed without affecting the operation of the unit. Obviously, too, a wide choice of bridge balance amplifying and indicating arrangements is available to the designer of such equipment, the arrangement shown being merely illustrative of the general type which should be employed. The selection of components will, of course, depend upon the particular tubes used and will follow known engineering design practices, well within the knowledge of those skilled in the electronic art.

In operation, after a suitable "warm-up" period has elapsed, the movable contact arm 29 of switch 4 is brought into contact with the switch terminal 37 so as to ground the grid of the cathode follower with respect to any input signals. The normal or no-signal current which will then flow through the cathode follower 8 will then be adjusted, by shifting the movable arm 35 and thereby controlling the bias on the grid 7 of the cathode follower, so that the voltage drop across cathode resistor 10 will exactly balance the voltage of the battery 13. This will insure that only the alternating components of the input signal will affect the balance of the bridge network and will consequently keep the current flowing through the thermistor 12 to a minimum value. Switch arm 29 will then be shifted to the desired terminal of the step attenuator 3, for example, to the terminal 38, as indicated in the diagram, so that the input signal appearing across input terminals 1 and 2 will be passed by the cathode follower to the terminals 18 and 19 of the bridge network and thence through the thermistor 12 and balancing resistor 20 in parallel. The heating effect of the resulting current flowing through thermistor 12 will vary its resistance and, as a result, will throw the bridge network out of balance. Under these conditions there will be a 35 kilocycle voltage appearing across the output terminals 18 and 19, which voltage will be applied through the high-pass filter 23 to the amplifiers 24 and 26 and will thereby produce a deflection of the balance indicating meter 27. Resistor 20 will thereupon be adjusted so as to restore the bridge tube balance, as indicated by the meter 27. As previously indicated, thermistor 12 has a relatively long thermal time constant so that it will not respond to relatively short fluctuations in the output of the cathode follower but will gradually attain a temperature and resulting resistance which will be proportional to the R.M.S. or effective amplitude of the input signal. Once this stable condition has been reached, with the bridge balanced, switch arm 29 is thrown to terminal 30 and potentiometer 31 is adjusted until the bridge is again restored to balance. Since the effective or R.M.S. value of a voltage, regardless of its wave form, is a measure of the heating effect of that particular current, the effective or R.M.S. value of the 60 cycle voltage appearing at terminal 30 when balance has been thus restored, is also the effective or R.M.S. value of the input signal voltage and may be directly read from meter 34.

Obviously in order to avoid nonlinear effects which might otherwise obtain, where the signal voltage to be measured has an unduly high value, the desired portion of this voltage may be selected by switching switch arm 29 to an appropriate one of the other contacts 39, 40 or 41 of the attenuator.

As previously indicated, the particular components illustrated in the drawing are intended merely to be representative of many equivalent components well known in the art and are shown in this case for illustrative purposes only. Obviously many changes and substitutions could be made without affecting the operation of the apparatus and without departing from the spirit and scope of this invention as defined by the appended claims.

I claim:

1. In an apparatus for determining the effective amplitude of a low frequency alternating voltage of unknown wave form, an impedance bridge having a pair of bridge input terminals and a pair of bridge-balance-detecting terminals, means for applying a high-frequency voltage to the input terminals and means connected to the balance detecting terminals for indicating any potential difference therebetween, said bridge including a thermistor connected between one of said balance detecting terminals and one of said input terminals and an adjustable balancing resistor connected between the other of said balance detecting terminals and said one input terminal for balancing the impedance of said thermistor, and means connected to said bridge for applying a low frequency alternating voltage, the effective amplitude of which is to be determined, in parallel across said thermistor and said balancing resistor.

2. In an apparatus for determining the effective amplitude of a low frequency alternating voltage of unknown wave form, an impedance bridge having a pair of bridge input terminals and a pair of bridge-balance-detecting terminals, means for applying a high frequency voltage to the input terminals and means connected to the balance detecting terminals for indicating any potential difference therebetween, said bridge including a thermistor connected between one of said balance detecting terminals and one of said input terminals and an adjustable balancing resistor connected between the other of said balance detecting terminals and said one input terminal for balancing the impedance of said thermistor, a cathode follower including a control grid and a cathode, and having a load resistor in series with said cathode, means connecting said thermistor and said balancing resistor, parallel to one another, across said load resistor, and means for applying a low frequency signal, the effective amplitude of which is to be determined, to the grid of said cathode follower.

3. In an apparatus for determining the effective amplitude of a low frequency alternating voltage of unknown wave form, an impedance bridge having a pair of bridge input terminals and a pair of bridge-balance-detecting terminals, means for applying a high frequency voltage to the input terminals and means connected to the balance detecting terminals for indicating any potential difference therebetween, said bridge including a thermistor connected between one of said balance detecting terminals and one of said input terminals and an adjustable balancing resistor connected between the other of said balance detecting terminals and said one input terminal for balancing the impedance of said thermistor, a cathode follower including a control grid and a cathode, and having a load resistor in series with said cathode, means connecting said thermistor and said balancing resistor, parallel to one another, across said load resistor, and including a direct current voltage source arranged to neutralize the normal D.C. voltage appearing across said load resistor under no-signal conditions, and means for applying a low frequency signal, the effective amplitude of which is to be determined, to the grid of said cathode follower.

4. In an apparatus for determining the effective amplitude of a low frequency alternating voltage of unknown wave form, an impedance bridge having a pair of bridge input terminals and a pair of bridge-balance-detecting terminals, means for applying a high-frequency voltage to the input terminals and means connected to the balance detecting terminals for indicating any potential difference therebetween, said bridge including a thermistor connected between one of said balance detecting terminals and one of said input terminals and an adjustable balancing resistor connected between the other of said balance detecting terminals and said one input terminal for balancing the impedance of said thermistor, a low-pass filter, a cathode follower connected to the output of said low-pass filter and including a load resistor in series with the cathode thereof, means connecting said thermistor and said balancing resistor, parallel to one another, across said load resistor and including a D.C. voltage source arranged to neutralize the normal D.C. voltage appearing across said load resistor under no-signal conditions, and means for applying a low frequency signal, the effective amplitude of which is to be determined, to the input of said low-pass filter.

5. In an apparatus for determining the effective amplitude of a low frequency alternating voltage of unknown wave form, an impedance bridge having a pair of bridge input terminals and a pair of bridge-balance-detecting terminals, means for applying a high frequency voltage to the input terminals and means including a high-pass filter connected to the balance detecting terminals for indicating any potential difference therebetween, said bridge including a thermistor connected between one of said balance detecting terminals and one of said input terminals and an adjustable balancing resistor connected between the other of said balance detecting terminals and said one input terminal for balancing the impedance of said thermistor, and means connected to said bridge for applying a low frequency alternating voltage, the effective amplitude of which is to be determined, in parallel across said thermistor and said balancing resistor.

6. In an apparatus for determining the effective amplitude of low frequency electrical signals of unknown wave form, signal input terminals to which said signals are adapted to be applied, a source of low frequency alternating reference voltage of known wave form and adjustable in amplitude, a low-pass filter, and means for selectively connecting the input of said low-pass filter to said input terminals or to said source of reference voltage, a cathode follower connected to the output of said low-pass filter, and a thermistor connected to the output of said cathode follower whereby the impedance of said thermistor will be responsive to the output of said cathode follower, said thermistor having a time constant which is relatively large compared to the period of the lowest frequency alternating voltage component of the input signal to be measured, an impedance bridge including said thermistor as one leg thereof, a high frequency voltage source for exciting said bridge, means connected to said bridge and including a high-pass filter and an indicator responsive to said high frequency voltage for indicating any unbalance of the bridge, a variable impedance included in said bridge for balancing said bridge when said low-pass filter is connected to said input terminals, and means connected to said low frequency voltage source for controlling the amplitude of said reference voltage to rebalance said bridge when said low-pass filter is connected to said low frequency voltage source, and means responsive to said reference voltage for indicating the effective amplitude thereof.

References Cited in the file of this patent

UNITED STATES PATENTS

| 2,495,268 | Leiphart | Jan. 24, 1950 |
| 2,495,752 | Montgomery | Jan. 31, 1950 |
| 2,673,960 | Doblmaier | Mar. 30, 1950 |

FOREIGN PATENTS

| 678,836 | Great Britain | Sept. 10, 1952 |